US010936367B2

(12) United States Patent
Curino et al.

(10) Patent No.: US 10,936,367 B2
(45) Date of Patent: Mar. 2, 2021

(54) PROVENANCE DRIVEN JOB RELEVANCE ASSESSMENT

(71) Applicant: Microsoft Technology Licensing, LLC, Redmond, WA (US)

(72) Inventors: Carlo Aldo Curino, Woodinville, WA (US); Konstantinos Karanasos, San Francisco, CA (US); Subramaniam Venkatraman Krishnan, Santa Clara, CA (US); Christopher William Douglas, Mountain View, CA (US); Sriram S Rao, Saratoga, CA (US); Andrew F Chung, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 16/253,378

(22) Filed: Jan. 22, 2019

(65) Prior Publication Data

US 2020/0133726 A1 Apr. 30, 2020

Related U.S. Application Data

(60) Provisional application No. 62/751,639, filed on Oct. 28, 2018.

(51) Int. Cl.
*G06F 9/44* (2018.01)
*G06F 9/48* (2006.01)
(Continued)

(52) U.S. Cl.
CPC ............ *G06F 9/4887* (2013.01); *G06F 9/451* (2018.02); *G06F 9/5038* (2013.01);
(Continued)

(58) Field of Classification Search
CPC ...... G06F 9/4887; G06F 9/451; G06F 9/5038; G06F 2209/503; G06F 2209/505
See application file for complete search history.

(56) References Cited

U.S. PATENT DOCUMENTS 8,281,313 B1 10/2012 Santos et al.
8,555,281 B1 * 10/2013 van Dijk ............... G06F 9/4881
718/100
(Continued)

OTHER PUBLICATIONS

Abrishami, et al., "Cost-Driven Scheduling of Grid Workflows Using partial Critical Paths", In Proceedings of the IEEE Transactions on Parallel and Distributed Systems, vol. 23, Issue 8, Aug. 2012, pp. 1400-1414.
(Continued)

*Primary Examiner* — Hang Pan
(74) *Attorney, Agent, or Firm* — Rainier Patents, P.S.

(57) ABSTRACT

Described herein is a system and method for ranking and/or taking an action regarding execution of jobs of a shared computing cluster based upon predicted user impact. Information regarding previous executions of a plurality of jobs is obtained, for example, from job execution log(s). Data dependencies of the plurality of jobs are determined. Job impact of each of the plurality of jobs as a function of the determined data dependencies is calculated. User impact of each of the plurality of jobs as a function of the determined data dependencies, the calculated job impact, and time is calculated. The plurality of jobs are ranked in accordance with the calculated user impact. An action is taken in accordance with the ranking of the plurality of jobs. The action can include automatic scheduling of the jobs and/or providing information regarding the rankings to a user.

20 Claims, 5 Drawing Sheets

(51) Int. Cl.
*G06F 9/50* (2006.01)
*G06F 9/451* (2018.01)

(52) U.S. Cl.
CPC .. *G06F 2209/503* (2013.01); *G06F 2209/505* (2013.01); *G06F 2209/5021* (2013.01)

(56) References Cited

U.S. PATENT DOCUMENTS

| 9,223,628 | B2 | 12/2015 | Rastogi | |
|---|---|---|---|---|
| 2010/0251241 | A1* | 9/2010 | Cardelli | G06F 9/5038 718/100 |
| 2015/0067635 | A1* | 3/2015 | Chen | G06Q 10/06 717/102 |
| 2015/0347193 | A1* | 12/2015 | Wolfson | G06F 9/5038 718/103 |
| 2016/0140502 | A1* | 5/2016 | De | G06Q 10/06316 705/7.26 |
| 2019/0377602 | A1* | 12/2019 | Mosca | G06N 3/08 |

OTHER PUBLICATIONS

Wieczorek, et al., "Towards a General Model of the Multi-Criteria Workflow Scheduling on the Grid", In Journal of the Future Generation Computer Systems, vol. 25, Issue 3, Mar. 2009, pp. 237-256.

Yu, et al., "Workflow Scheduling Algorithms for Grid Computing", In Journal of Metaheuristics for scheduling in distributed computing environments, 2008, pp. 173-214.

Jyothi, Sangeetha Abdu, et al., "Morpheus: Towards Automated SLOs for Enterprise Clusters", Proceedings of the 12th USENIX Symposium on Operating Systems Design and Implementation (OSDI '16), Nov. 2-4, 2016, 19 pages.

Mavlyutov, Ruslan, et al., "Dependency-Driven Analytics: a Compass for Uncharted Data Oceans", 8th Biennial Conference on Innovative Data Systems Research (CIDR '17), Jan. 8-11, 2017, 9 pages.

"International Search Report and Written Opinion Issued in PCT Application No. PCT/US2019/056240", dated Jan. 8, 2020, 15 Pages.

* cited by examiner

PROVENANCE DRIVEN JOB RELEVANCE ASSESSMENT

RELATED APPLICATION

This application claims priority to U.S. Provisional Application No. 62/751,639, filed Oct. 28, 2018, entitled "Provenance Driven Job Relevance Assessment", the disclosure of which is hereby incorporated by reference herein in its entirety.

BACKGROUND

Large companies operate increasingly complex infrastructures to collect, store and analyze vast amounts of data. For example, a particular infrastructure can include a quantity of very large clusters (e.g., up to 50,000 nodes each) serving thousands of consumers (e.g., data scientists), running hundreds of thousands of jobs daily, and accessing billions of files.

SUMMARY

Described herein is a system for ranking and/or taking an action regarding execution of jobs of a shared computing cluster based upon predicted user impact, comprising: a processing system comprising one or more processors and one or more memories having computer-executable instructions stored thereupon which, when executed by the one or more processors, cause the processing system to: obtain information regarding previous executions of a plurality of jobs; determine data dependencies of the plurality of jobs; calculate job impact of each of the plurality of jobs as a function of the determined data dependencies; calculate user impact of each of the plurality of jobs as a function of the determined data dependencies, the calculated job impact and time; rank the plurality of jobs in accordance with the calculated user impact; and, take an action in accordance with the ranking of the plurality of jobs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to ranking and taking an action regarding execution of jobs of a shared computing cluster based upon predicted user impact are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding ranking and, optionally, prioritizing execution of jobs of a shared computing cluster based upon predicted user impact. What follows are one or more exemplary systems and methods.

Aspects of the subject disclosure pertain to the technical problem of prioritizing jobs to be executed based upon job impact taking into account job utility as a function of time. The technical features associated with addressing this problem involve obtaining information regarding previous executions of a plurality of jobs (e.g., from job execution log(s)); determining data dependencies between the plurality of jobs; calculating job impact of each of the plurality of jobs as a function of the determined data dependencies; calculating user impact of each of the plurality of jobs as a function of the determined data dependencies, job impact and time; ranking the plurality of jobs based upon the calculated user impact; and, taking an action in accordance with the ranking of the plurality of jobs. Accordingly, aspects of these technical features exhibit technical effects of more efficiently and effectively scheduling jobs, for example, reducing resource consumption and/or wasted resource(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Large companies operate increasingly complex infrastructures to collect, store and analyze vast amounts of data. For example, a particular infrastructure can include a quantity of very large clusters (e.g., up to 50,000 nodes each) serving thousands of consumers (e.g., data scientists), running hundreds of thousands of jobs daily, and accessing billions of files. Determining scheduling of jobs in accordance with available resources, consumer expectations, contractual obligations and the like can be a complex task.

Described herein is a system and method for ranking and taking an action regarding execution of jobs of a shared computing cluster based upon predicted job impact. The invention addresses the problem of understanding the importance of a job (e.g., in an absolute sense as compared to any other job), and to do so "over time", that is, how the timeliness of delivery of a job's output affects the importance of this job. This can be relevant to both customers (e.g., to estimate whether they are devoting resources to the right jobs) and to cluster operators (e.g., to choose which job to migrate to a new version of the software first, or which job to run in case of a capacity impairment).

Previous manual solutions have relied on imprecise and a partial user's understanding of job's importance. In certain situations, it can be inherently difficult for users to quantify how their jobs relate to jobs of others in terms of importance (e.g., due to lack of visibility). For example, certain systems allow users to provide information regarding "queue sizes", "queue priorities", and/or "job parallelism allocations". Frequently, users have failed to assign these variables to successfully deliver jobs in a timely manner, without wasting resources.

The system and method described herein leverage "provenance" (e.g., the lineage of data dependencies among jobs) and their telemetry (e.g., statistics about a job execution, such as time in which the job was started/completed, CPU hours spend by the jobs, total data read/written) to automatically derive a notion of "relevance/importance" of a job, and correlate it to time of the job execution ("job impact").

Figure 1:
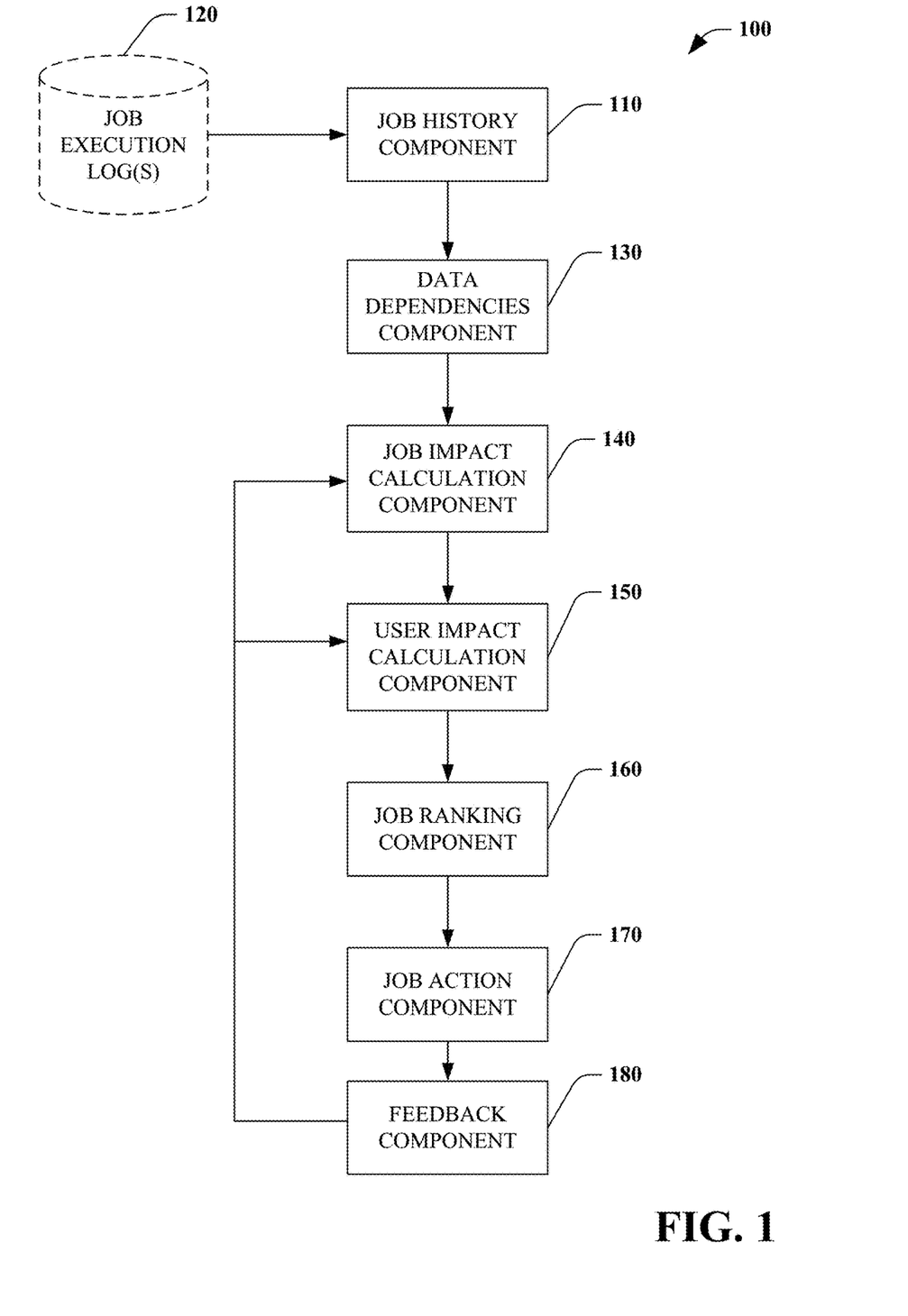
FIG. 1 is a functional block diagram that illustrates a system for ranking and/or taking an action regarding execution of jobs of a shared computing cluster based upon predicted user impact.

Referring to FIG. 1, a system for ranking and/or taking an action regarding execution of jobs of a shared computing cluster based upon predicted user impact 100 is illustrated. In the context of data process system(s) ("DPS") such as databases, streaming systems, big-data clusters, etc., the notion of "jobs" is used. A "job" includes bounded amounts of computation performed by a possibly large collection of tasks to transform a given "input" into a given "output". Jobs are often units of scheduling (e.g., how much resources are allocated to a particular job and when) and are used by customers to complete often mission critical objectives.

As DPS's become large and complex it can become difficult to track and understand which jobs are receiving resources, when the jobs complete, etc. In some situations, timely execution of such jobs can be crucial in that a job completing too late may violate service level objectives (SLOs) at the application level that could have potentially devastating consequences.

Conventionally, quantifying the importance of jobs and their timely execution is often left to the user and it is a labor-intensive and error-prone task. Jobs with targets for execution latencies are usually recurring running over fresh versions of arriving data at some periodicity, such as hourly, daily, etc. The system 100 can utilize this observation in order to open up the opportunity to leverage observations from past runs to inform decisions made for future runs. The system 100 provides a mechanism that leverages historical traces of job executions, and tracks their provenance (i.e., the lineage of data dependencies among jobs) and their telemetry (e.g., statistics about a job execution, such as time in which the job was started/completed, CPU hours spend by the jobs, total data read/written) to automatically derive a notion of "relevance/importance" of a job, and correlate it to time of the job execution to arrive at job-impact based utility function(s).

The system 100 includes a job history component 110 that obtains information regarding previous executions of a plurality of jobs, for example, from one or more job execution logs 120. The system 100 further includes a data dependencies component 130 that determine data dependencies between the plurality of jobs. In some embodiments, the data dependencies can be represented by a DAG.

The system 100 further includes a job impact calculation component 140 that calculate impact of each of the plurality of jobs as a function of the determined data dependencies.

Job-impact-based utility functions are based upon expressing job utility in terms of aggregate job-impact on downstream jobs, where impact can be measured as a function of metrics of the target job and its downstream jobs (e.g., all). In some embodiments, job-impact can be expressed in terms of how much downstream work a job is able to unblock once it is completed, or how much work cannot proceed due to the job failing or being delayed. By way of explanation and not limitation, job metrics can include aggregate job CPU hours and/or a total number of "downloads" of output files generated by the target job and its downstream jobs (e.g., how many times any of the direct or indirect byproducts of this job were externalized from the DPS).

In some embodiments, the utility of an unfinished job necessarily decays as time passes (e.g., data becomes stale) and downstream jobs with hard dependencies fail to start. Therefore, to model job utility as a function of time in the context of job-impact, "deadlines" of the target job are set (e.g., time of "drops" in utility) as time-to-submission (e.g., relative to the submission time of the target job) of hard-dependency children jobs.

In some embodiments, different from the shape of most job utility functions where a job only has a single deadline at which point its utility rapidly declines, the number and magnitude of utility drops in the system 100 can depend on a job's children jobs.

Constructing utility functions based on job-impact can provide insights in to a particular cluster's workloads. In some embodiments, problematic issues and/or interesting properties can be identified. For purposes of explanation and not limitation, these can include (1) a number of abandoned periodic jobs, (2) significant amounts of cross-organization job dependencies (3) nonsensical priorities, and/or (4) long job dependency chains comprised of up to hundreds of jobs in length spanning multiple weeks.

In some embodiments, using a scheduler with job-impact-based utility functions can allow parallelism (e.g., maximum) in a cluster by unblocking jobs in an effective manner. However, the scheduler may likely focus on jobs closer to the \roots" of a directed acyclic graph (DAG) of job dependencies while ignoring jobs deeper into the DAG, where, in some embodiments, the jobs with significant value to users lie.

The system 100 also includes a user impact calculation component 150 that calculates user impact of each of the plurality of jobs as a function of the determined data dependencies, the calculated job impact and time.

In some embodiments, job utility functions can be refined by not only considering how much impact a job has on downstream jobs, but also how much value a job actually carries to its submitting users by also looking at workflow descriptions and job latency-based alerts. That is, by incorporating user-impact into realistic job-impact based utility functions, the system 100 can more efficiently and effectively taken action(s) (e.g., scheduling) with respect to jobs.

Many users' business tasks cannot be completed by running a single job. Instead, users often define recurring job pipelines, or work flows, that include a set of jobs and data operations that depend on each other. In some embodiments, the highest user-impact jobs (e.g., jobs that contribute the most "value" to users or raises incidents to operators or users) usually lie at the end of workflows, since if intermediate jobs already produce the output the users care about, there would be no need to submit jobs consuming the output of the intermediate jobs.

In some embodiments, automated incident alarms tied to delayed output of jobs in a workflow can be examined. These automated incident alarms can be indicative of a situation in which one or more jobs are pending output(s) from other job(s). If most of the alarms are polling for output of jobs near the end of a workflow, it is likely that these "leaf" jobs are indeed the jobs that contribute the most "value" to users. In some embodiments, while using utility functions based on job impact can most likely unblock the most downstream jobs for execution, only using job-impact-based utility can potentially stand in contradiction with the goal to optimize for user value, as jobs earlier in workflows necessarily have higher job-impact-based utility than those later in workflows. The system 100 can employ "realistic" job utility functions which take into consideration user-impact-based utility using features and signals from user-submitted workflows, ultimately leading to the generation of realistic utility functions that balance job-impact-based utility with user-impact-based utility.

The system 100 also includes a job ranking component 160 that ranks the plurality of jobs based upon the calculated user impact. The system 100 further includes a job action component 170 that takes an action in accordance with the ranking of the plurality of jobs. In some embodiments, the action can include automatically scheduling the jobs in accordance with the ranking of the plurality of jobs. In some embodiments, the action can include providing information regarding the ranking of the plurality of jobs to user(s) (e.g., via a graphical user interface) to allow the user(s) to accept, reject, and/or modify the ranking of the plurality of jobs. In some embodiments, the information provided can include information utilized by the system 100 in arriving at the ranking, for example, the information regarding previous executions of the plurality of jobs, the determined data dependencies, the calculated job impact, and/or the calculated user impact.

In some embodiments, the system 100 can further include a feedback component 180 that provides feedback (e.g., results) to the job impact calculation component 140 and/or the user impact calculation component 150 with respect to the action taken. In this manner the job impact utility function utilized by the job impact calculation component 140 and/or the user impact utility function utilized the user impact calculation component 150 can be adaptively updated based on results taken/obtained based upon the action taken.

In some embodiments, when the action taken is automatically scheduling the jobs in accordance with the ranking of the plurality of jobs, the feedback can include any anomalies such as automated incident alarm(s), user action(s), information regarding execution of the jobs, etc. received. In some embodiments, when the action taken is providing information regarding the ranking of the plurality of jobs to user(s), the feedback can include action(s) taken by the user(s) regarding scheduling of the plurality of jobs (e.g., modification(s) to the ranking) and/or information regarding execution of the jobs.

Traditionally, in some scenarios, a customer pays for the hardware resources used to produce a dataset. In some embodiments, the system 100 can include "pricing" based on data consumption and/or data production. The system 100 can provide a form of pricing in which a consumer of a particular dataset shares (e.g., all or some) the cost of producing the particular datasets. For example, a particular consumer can be responsible for a portion of the computational cost of the upstream job. In some embodiments, the particular consumer can be compensated by other downstream consumer(s) for the cost of running the particular consumer's job(s). The system 100 can thus provide arbitrage, for example, particularly where a job consumes "common" dataset(s) and produces "unique" or highly desirable datasets, it can charge a delta for the value added by that computation.

In some embodiments, a user (e.g., customer) can specify importance of dataset(s) downloaded from the computing cluster to the system 100. The system 100 can back propagate the specified importance up to one or more jobs involved in producing the downloaded dataset(s). For example, the specified importance can be back propagated to each job involved in producing the downloaded dataset(s).

For purposes of explanation and not limitation, data dependencies have been used to quantify job impact/importance. In some embodiments, other factor(s) can be utilized to quantify job impact/importance in place of or in addition to data dependencies. Information regarding importance of a user that submitted a particular job (e.g., role within a corporate/governmental hierarchy, specified within a contractual obligation associated with the computing cluster), the size of a particular job, the number of downloads of its output, etc. can be utilized to quantify job impact/importance.

In some embodiments, when scheduling jobs based on their impact/ranking, the system 100 can also add different goal(s). For example, the system 100 can try to minimize the service level agreement (SLA) violations and/or the monetary loss from not executing a job on time.

In some embodiments, the system 100 can utilize machine-learning model(s) in which accuracy can be traded for time and/or resources, creating a utility function $U(t,a)$ that depends on both time t and accuracy a.

While the disclosed subject matter has been discussed in the context of scheduling of jobs of data processing systems, in some embodiments, the system 100 can be utilized to schedule tasks (e.g., manual and/or automated) such as workflows. For example, using historical data, dependencies between tasks can be determined. Task impact of each of the plurality of tasks can be calculated as a function of the determined dependencies. Thereafter, user impact of each of the plurality of tasks as a function of the determined dependencies, the calculated task impact, and, time, can be calculated. The tasks can then be ranked in accordance with the calculated user impact. Scheduling of tasks can then be performed in accordance with the ranking of the plurality of tasks.

Figure 2:
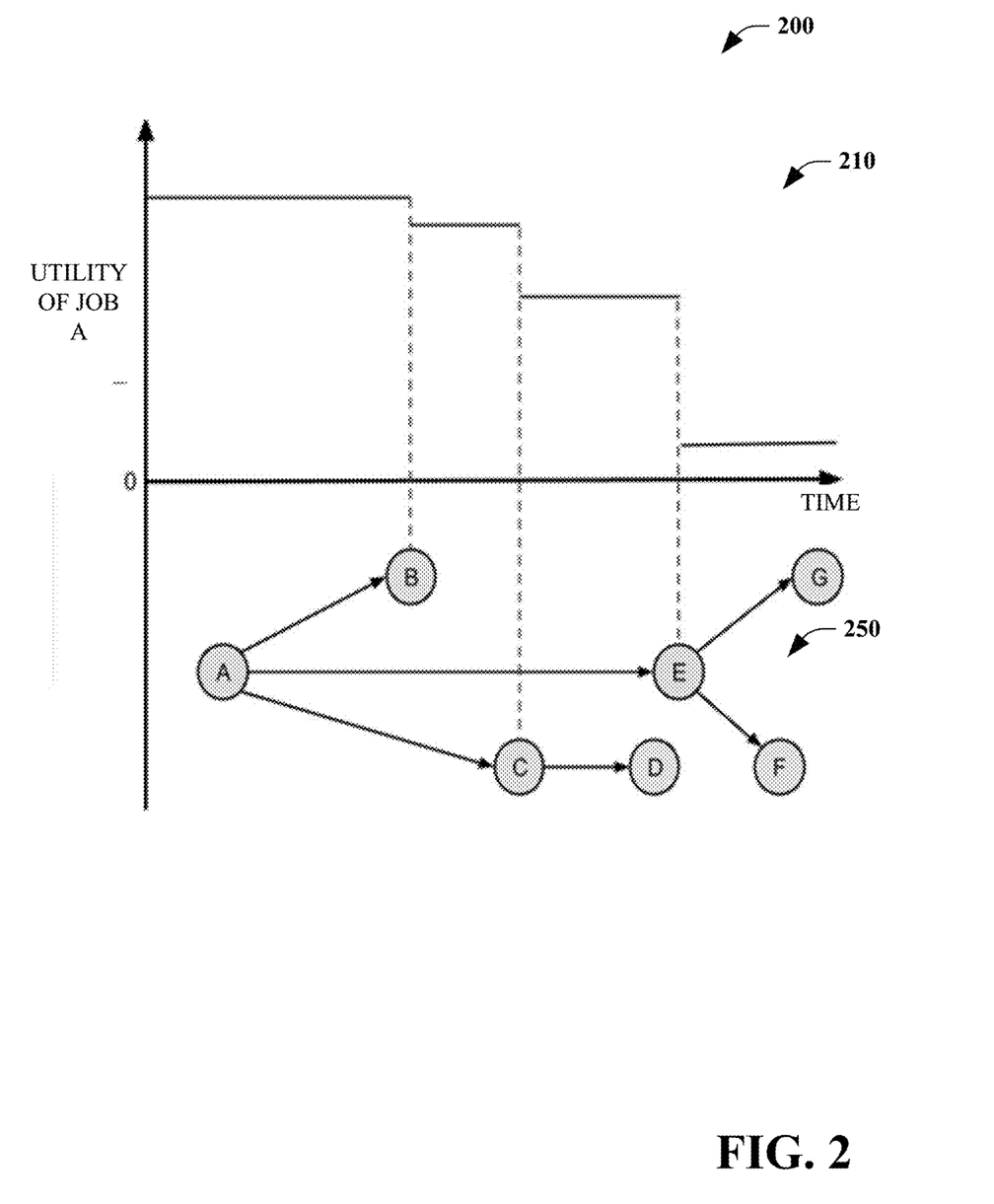
FIG. 2 is a graphical user interface.

Turning to FIG. 2, in some embodiments, information regarding job impact calculated by the system 100 can be made available to user(s) in graphical user interface(s) which allow users to analyze the impact of their jobs on downstream jobs and operations. It can be part of a broader effort to quantify the "utility," or value, of recurring jobs through analyzing job history and telemetry. The information provided can be consistent with a to be data-driven, such that the "value" of a job as determined by the system can be backed with concrete historical data.

The graphical user interface(s) can provide workload insight into job(s). FIG. 2 is a graphical user interface 200 that includes a graph 210 that demonstrates utility of a job A as a function of time, and, a dependency graph 250. As discussed above a utility function is indicative of a job value as a function of time. In some embodiments, the "value" of a job is based on aggregate downstream dependencies. As deadlines for jobs and/or operations pass, the utility of a job decreases.

With respect to graph 200 and dependent graph 250, the utility of job A drops as dependencies B, C, and E are submitted. The utility drops a greater amount for C than B because C has a downstream dependency while B has none. The utility drops still a greater amount for E than C because E has two downstream dependencies.

The graphical user interface(s) which allow users to analyze the impact of their jobs on downstream jobs and operations can include a search capability allowing user(s) to search for job instance(s) and/or recurring job(s) with different parameters (e.g., using a search box).

Searching for a job can result in a list of jobs matching the search criteria be presented. The user can click on a recurring job link for the recurring job of the job instance, or a details link for more instance details on the job.

Clicking on the details link can bring the user to a job details page. The job details page can show a graph of the utility function of the job instance, the utility function of other job instances of the recurring job, and the average utility function of the recurring job.

In some embodiments, the job details page also shows a dependency graph of the utility of the job based on the utility contributed by downstream jobs/operations. Further, in some embodiments, the user can toggle the type of utility function/dependency graph displayed using the dropdown list (e.g., by PnHours and/or by Downloads).

Figure 3:
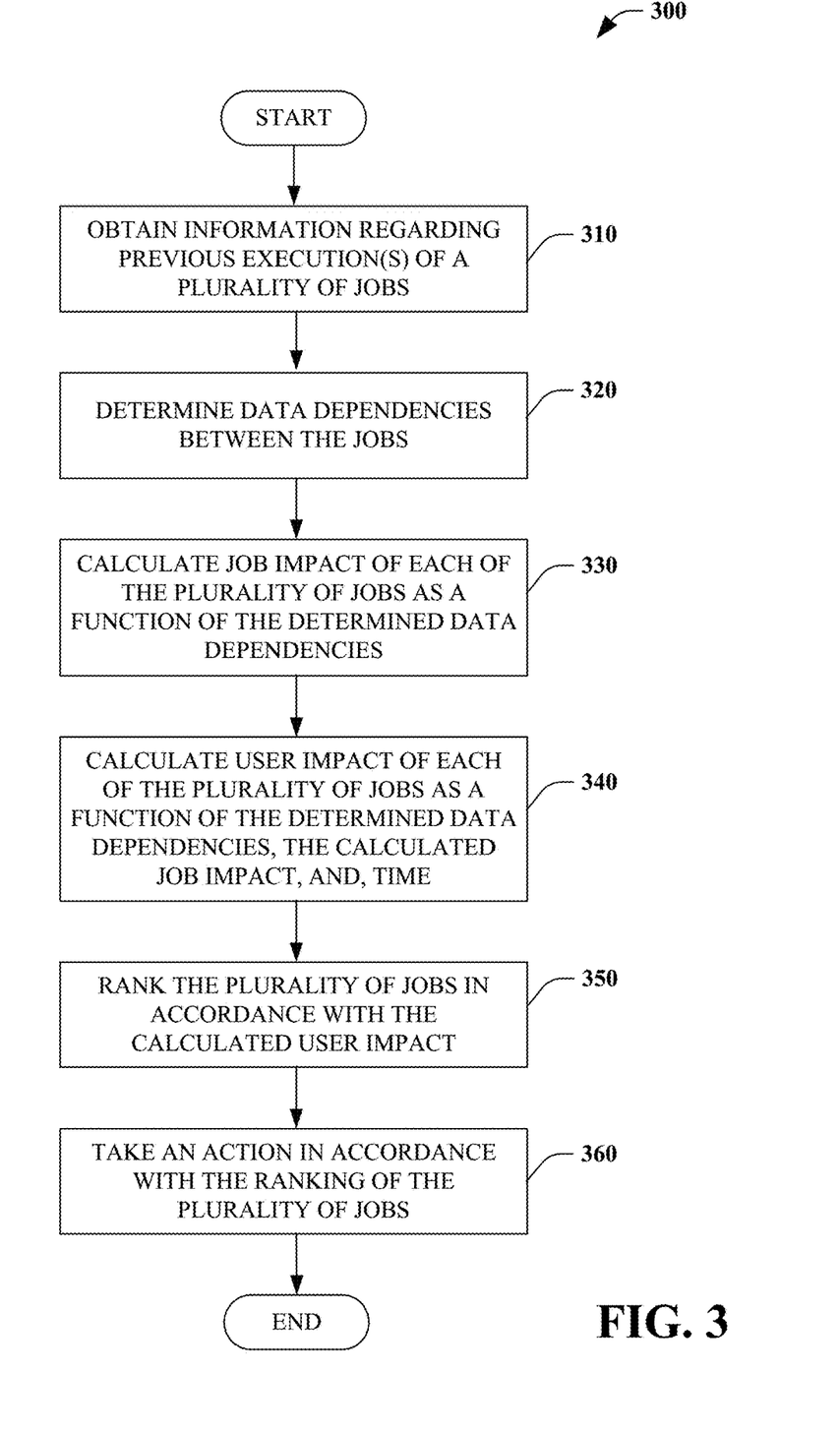
FIG. 3 is a flow chart that illustrates a method of ranking and/or taking an action regarding execution of jobs of a shared computing cluster based upon predicted user impact.
Figure 4:
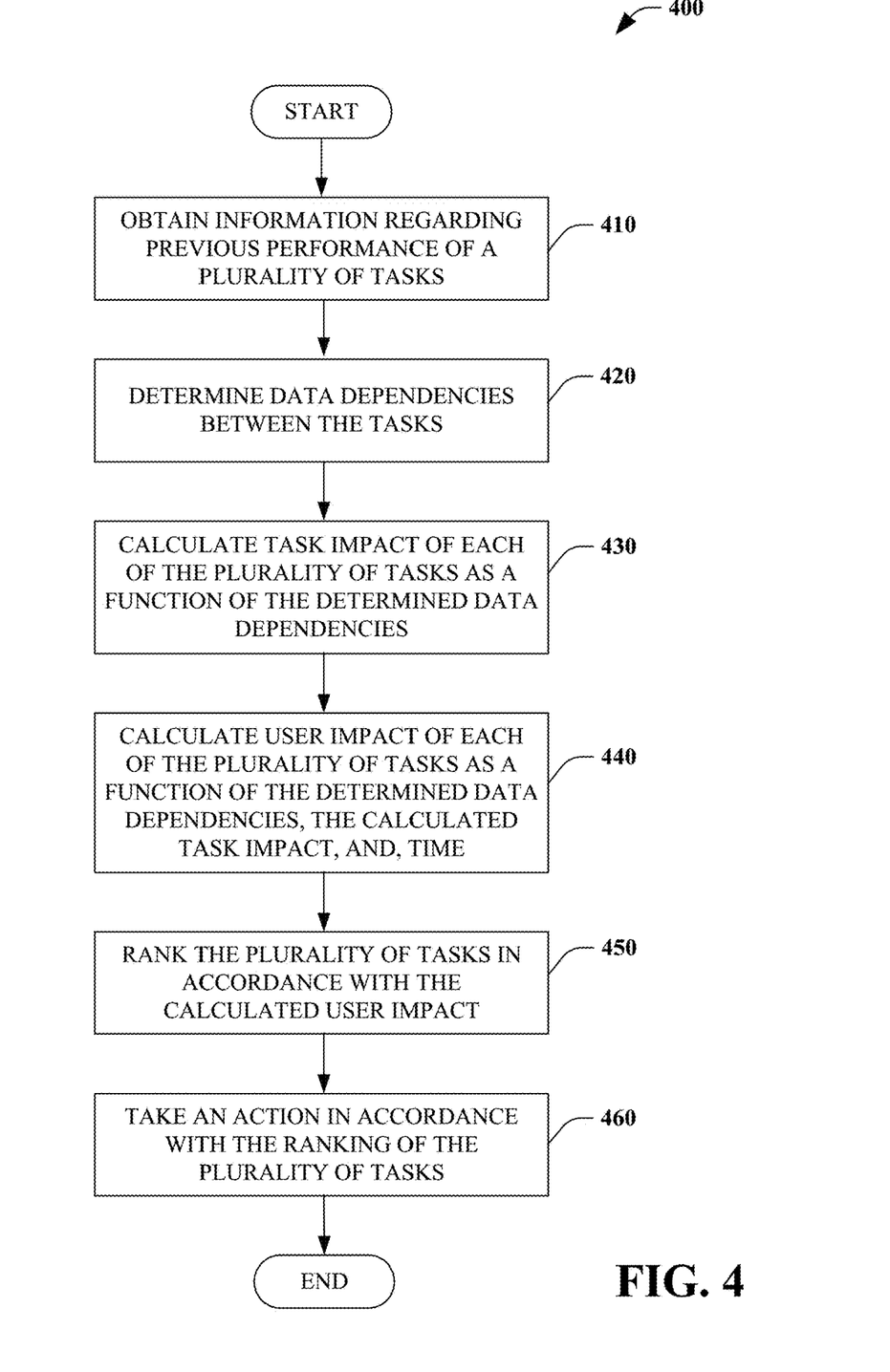
FIG. 4 is a flow chart that illustrates a method of ranking and/or taking an action regarding performance of tasks based upon predicted user impact.

FIG. 3 illustrates an exemplary methodology relating to ranking and/or taking an action regarding execution of jobs of a shared computing cluster based upon predicted user impact. FIG. 4 illustrates an exemplary methodology relating to ranking and/or taking an action regarding performance of tasks based upon predicted user impact. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of ranking and/or taking an action regarding execution of jobs of a shared computing cluster based upon predicted user impact 300 is illustrated. In some embodiments, the method 300 is performed by the system 100.

At 310, information regarding previous execution(s) of a plurality of jobs is obtained. At 320, data dependencies between the jobs, if any, is determined.

At 330, a job impact of each of the plurality of jobs is calculated as a function of the determined data dependencies. At 340, a user impact of each of the plurality of jobs is calculated as a function of the determined data dependencies, the calculated job impact, and time.

At 350, the plurality of jobs are ranked in accordance with the calculated user impact. At 360, an action is taken in accordance with the ranking of the plurality of jobs.

Referring to FIG. 4, a method of ranking and/or taking an action regarding performance of tasks based upon predicted user impact 400 is illustrated. In some embodiments, the method 400 is performed by the system 100.

At 410, information regarding previous performance of a plurality of tasks is obtained. At 420, data dependencies between the tasks, if any, is determined.

At 430, a task impact of each of the plurality of tasks is calculated as a function of the determined data dependencies. At 440, a user impact of each of the plurality of tasks is calculated as a function of the determined data dependencies, the calculated task impact, and time.

At 450, the plurality of tasks are ranked in accordance with the calculated user impact. At 460, an action is taken in accordance with the ranking of the plurality of tasks. For example, the tasks can be scheduled in accordance with the ranking of the plurality of tasks.

Described herein is a system for ranking and/or taking an action regarding execution of jobs of a shared computing cluster based upon predicted user impact. The system can include a processing system comprising one or more processors and one or more memories having computer-executable instructions stored thereupon which, when executed by the processor, cause the processing system to: obtain information regarding previous executions of a plurality of jobs; determine data dependencies of the plurality of jobs; calculate job impact of each of the plurality of jobs as a function of the determined data dependencies; calculate user impact of each of the plurality of jobs as a function of the determined data dependencies, the calculated job impact and time; rank the plurality of jobs in accordance with the calculated user impact; and take an action in accordance with the ranking of the plurality of jobs.

The system can further include wherein the information regarding previous executions of a plurality of jobs is obtained from one or more job execution logs. The system can further include wherein the action taken comprises automatically scheduling the plurality of jobs in accordance with the ranking of the plurality of jobs and time-based properties of job utility. The system can further include wherein the action taken comprises providing information regarding the ranking of the plurality of jobs to a user via a graphical user interface.

The system can include the one or more memories having further computer-executable instructions stored thereupon which, when executed by the one or more processors, cause the processing system to: receive input from the user to at least one of accept, reject, or modify the ranking of the plurality of jobs. The system can further include wherein the information provided to the user comprises information utilized by the system in arriving at the ranking. The system can further include wherein the information provided to the user comprises at least one of information regarding previous executions of the plurality of jobs, the determined data dependencies, the calculated job impact, or the calculated user impact.

The system can include the one or more memories having further computer-executable instructions stored thereupon which, when executed by the one or more processors, cause the processing system to: receive feedback regarding the action taken; adaptively update a job impact utility function utilized to calculate job impact; and adaptively update a user impact utility function utilized to calculate user impact.

Described herein is a method of ranking and/or taking an action regarding execution of jobs of a shared computing cluster based upon predicted user impact, comprising: obtaining information regarding previous executions of a plurality of jobs; determining data dependencies of the plurality of jobs; calculating job impact of each of the plurality of jobs as a function of the determined data dependencies; calculating user impact of each of the plurality of jobs as a function of the determined data dependencies, the calculated job impact and time; ranking the plurality of jobs in accordance with the calculated user impact; and taking an action in accordance with the ranking of the plurality of jobs.

The method can further include wherein the information regarding previous executions of a plurality of jobs is obtained from one or more job execution logs. The method can further include wherein the action taken comprises automatically scheduling the plurality of jobs in accordance with the ranking of the plurality of jobs. The method can further include wherein the action taken comprises providing information regarding the ranking of the plurality of jobs to a user via a graphical user interface.

The method can further include receiving input from the user to at least one of accept, reject, or modify the ranking of the plurality of jobs. The method can further include wherein the information provided to the user comprises information utilized by the system in arriving at the ranking. The method can further include wherein the information provided to the user comprises at least one of information regarding previous executions of the plurality of jobs, the determined data dependencies, the calculated job impact, or the calculated user impact.

The method can further include receiving feedback regarding the action taken; adaptively updating a job impact utility function utilized to calculate job impact; and adaptively updating a user impact utility function utilized to calculate user impact.

Described herein is a computer storage media storing computer-readable instructions that when executed cause a computing device to: obtain information regarding previous executions of a plurality of jobs; determine data dependencies of the plurality of jobs; calculate job impact of each of the plurality of jobs as a function of the determined data dependencies; calculate user impact of each of the plurality of jobs as a function of the determined data dependencies, the calculated job impact and time; rank the plurality of jobs in accordance with the calculated user impact; and take an action in accordance with the ranking of the plurality of jobs.

The computer storage media can further include wherein the action taken comprises automatically scheduling the plurality of jobs in accordance with the ranking of the plurality of jobs. The computer storage media can further include wherein the action taken comprises providing information regarding the ranking of the plurality of jobs to a user via a graphical user interface. The computer storage media can store further computer-readable instructions that when executed cause a computing device to: receive feedback regarding the action taken; adaptively update a job impact utility function utilized to calculate job impact; and adaptively update a user impact utility function utilized to calculate user impact.

Figure 5:
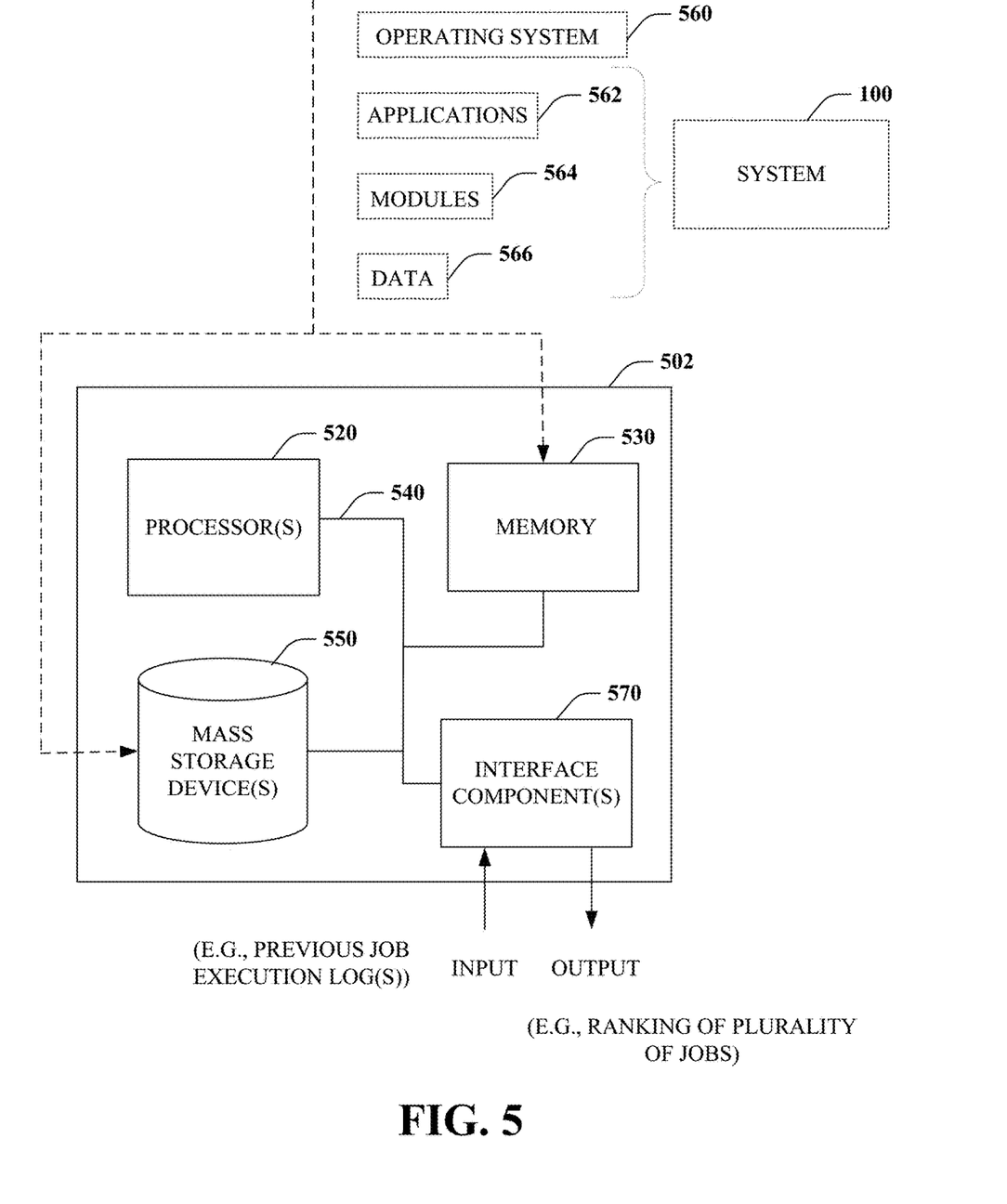
FIG. 5 is a functional block diagram that illustrates an exemplary computing system.

With reference to FIG. 5, illustrated is an example general-purpose processing system, computer or computing device 502 (e.g., mobile phone, desktop, laptop, tablet, watch, server, hand-held, programmable consumer or industrial electronics, set-top box, game system, compute node, etc.). For instance, the computing device 502 may be used in a system for ranking and/or taking an action regarding execution of jobs of a shared computing cluster based upon predicted user impact 100.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502.

Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device (s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In accordance with one particular embodiment, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g., serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
   one or more processors; and
   one or more memories having computer-executable instructions stored thereupon which, when executed by the one or more processors, cause the system to:
   obtain information regarding previous executions of a plurality of jobs;
   based at least on the information regarding the previous executions, determine data dependencies of the plurality of jobs;
   determine job impacts of individual jobs as a function of the data dependencies, wherein respective job impacts for the individual jobs decrease over time as deadlines pass for other jobs that depend on the individual jobs;
   determine user impacts of the individual jobs as a function of the data dependencies and the job impacts;
   determine a ranking of the individual jobs in accordance with the user impacts; and
   take at least one job-scheduling action in accordance with the ranking of the individual jobs.

2. The system of claim 1, wherein the information regarding previous executions is obtained from one or more job execution logs.

3. The system of claim 1, wherein the at least one job-scheduling action involves automatically scheduling the plurality of jobs in accordance with the ranking of the individual jobs and time-based properties of job utility.

4. The system of claim 1, the one or more memories having further computer-executable instructions stored thereupon which, when executed by the one or more processors, cause the system to:
output information regarding the ranking of the individual jobs via a graphical user interface.

5. The system of claim 4, the one or more memories having further computer-executable instructions stored thereupon which, when executed by the one or more processors, cause the system to:
receive input via the graphical user interface to at least one of accept, reject, or modify the ranking of the individual jobs.

6. The system of claim 4, wherein the information output via the graphical user interface comprises information utilized by the system in arriving at the ranking.

7. The system of claim 6, wherein the information output via the graphical user interface comprises at least one of the information regarding the previous executions, information regarding the data dependencies, information regarding the job impacts, or information regarding the user impacts.

8. The system of claim 1, the one or more memories having further computer-executable instructions stored thereupon which, when executed by the one or more processors, cause the system to:
receive feedback regarding the at least one job-scheduling action;
based at least on the feedback, adaptively update a job impact utility function utilized to determine the job impacts; and
based at least on the feedback, adaptively update a user impact utility function utilized to determine the user impacts.

9. A method, comprising:
determining data dependencies of a plurality of jobs;
determining job impacts of individual jobs as a function of the data dependencies, wherein respective job impacts for the individual jobs decrease over time as deadlines pass for other jobs that depend on the individual jobs;
determining a ranking of the individual jobs based at least on the job impacts; and
taking at least one job-scheduling action in accordance with the ranking of the individual jobs.

10. The method of claim 9, further comprising:
reducing a particular job impact for a particular job over time at least twice as deadlines pass for at least two other jobs that are dependent on the particular job.

11. The method of claim 9, further comprising:
providing information regarding the ranking via a graphical user interface.

12. The method of claim 11, further comprising:
receiving input to at least one of accept, reject, or modify the ranking.

13. The method of claim 11, wherein the information provided via the graphical user interface comprises information utilized in arriving at the ranking.

14. The method of claim 13, wherein the information provided via the graphical user interface comprises at least one of information regarding previous executions of the plurality of jobs, information regarding the data dependencies, or information regarding the job impacts.

15. The method of claim 9, further comprising:
receiving feedback regarding the at least one job-scheduling action; and
adaptively updating a job impact utility function utilized to determine the job impacts based at least on the feedback.

16. The method of claim 15, wherein the feedback indicates that an automated incident alarm tied to delayed job output has occurred.

17. A computer storage media storing computer-readable instructions that, when executed, cause a computing device to:
obtain information regarding previous executions of a plurality of jobs;
determine data dependencies of the plurality of jobs from the information regarding the previous executions;
determine job impacts of individual jobs as a function of the data dependencies, wherein respective job impacts for the individual jobs decrease over time as deadlines pass for other jobs that depend on the individual jobs;
determine user impacts of the individual jobs as a function of the data dependencies and the job impacts;
determine a ranking of the individual jobs based at least on the user impacts; and
take at least one job-scheduling action in accordance with the ranking of the individual jobs.

18. The computer storage media of claim 17, wherein the computer-readable instructions, when executed, cause the computing device to:
output information regarding the ranking via a graphical user interface.

19. The computer storage media of claim 17, wherein the computer-readable instructions, when executed, cause the computing device to:
receive feedback regarding the at least one job-scheduling action; and
based at least on the feedback:
adaptively update a job impact utility function utilized to determine the job impacts; and
adaptively update a user impact utility function utilized to determine the user impacts.

20. The computer storage media of claim 19, wherein the feedback indicates that an automated incident alarm has occurred.

* * * * *